(12) United States Patent
Kindikeri

(10) Patent No.: US 8,383,967 B2
(45) Date of Patent: Feb. 26, 2013

(54) METHOD AND APPARATUS FOR INDICIA SELECTION

(75) Inventor: Janardhan Kindikeri, Waltham, MA (US)

(73) Assignee: SimplexGrinnell LP, Westminster, MA (US)

( * ) Notice: Subject to any disclaimer, the term of this patent is extended or adjusted under 35 U.S.C. 154(b) by 291 days.

(21) Appl. No.: 12/819,936

(22) Filed: Jun. 21, 2010

(65) Prior Publication Data

US 2011/0030609 A1     Feb. 10, 2011

Related U.S. Application Data

(60) Provisional application No. 61/231,090, filed on Aug. 4, 2009.

(51) Int. Cl.
*H01H 19/02* (2006.01)
(52) U.S. Cl. ....................... 200/14; 200/11 R
(58) Field of Classification Search ............... 200/11 A, 200/11 R, 14, 336, 564, 572
See application file for complete search history.

(56) References Cited

U.S. PATENT DOCUMENTS

| | | | |
|---|---|---|---|
| 3,235,680 A * | 2/1966 | Sheinberg | 200/38 DB |
| 6,326,905 B1 | 12/2001 | Walters | |
| 6,426,697 B1 | 7/2002 | Capowski et al. | |
| 6,992,658 B2 * | 1/2006 | Wu et al. | 345/169 |
| 7,623,652 B2 * | 11/2009 | Mori et al. | 379/367 |

* cited by examiner

*Primary Examiner* — Amy Cohen Johnson
*Assistant Examiner* — Marina Fishman
(74) *Attorney, Agent, or Firm* — Brinks Hofer Gilson & Lione

(57) ABSTRACT

An input device that may work in combination with an electronic device is provided. The input device is configured to input one or more adjustable parameters to the electronic device. The input device uses a plurality of concentric rotary dials to input the one or more adjustable parameters. The concentric rotary dials are co-planar with one another, and share a common center, axis or origin with one inside the other. The concentric rotary dials may have different radii from one another. Further, the concentric rotary dials have a plurality of indicia on one surface of the concentric rotary dials (such as the upper surface). Or, the indicia may be on a surface adjacent to the concentric rotary dials (such as on a non-movable faceplate). A user may move the concentric rotary dials to one or more settings in order to select one of the plurality of indicia.

17 Claims, 14 Drawing Sheets

METHOD AND APPARATUS FOR INDICIA SELECTION

REFERENCE TO RELATED APPLICATION

This application claims the benefit of U.S. Provisional Application No. 61/231,090, filed Aug. 4, 2009, the entirety of this application is hereby incorporated by reference herein.

BACKGROUND

Fire alarm devices such as audible horns (audible/visible or A/V), loudspeakers (speaker/visible or S/V) and visible strobes (visible only or V/O), are referred to as "notification appliances." Some notification appliances include addresses so that a fire alarm control panel (FACP) may send a command, with the address, to a specific notification appliance.

One way to set the address of the notification appliances is by using DIP switches. A DIP switch is a set of manual electric switches that are packaged in a group in a standard dual in-line package (DIP). This type of switch is designed to be used on a printed circuit board along with other electronic components and is commonly used to customize the behavior of an electronic device for specific situations, such as assigning the address. Each DIP switch typically has an "on" position and an "off" position. This allows the operator to set each DIP switch to select a one-bit binary value. The values of some or all switches in the DIP package can also be interpreted as one number. For example, seven switches offer 128 combinations. However, since the DIP switch sets the address in binary numbers, it can be difficult for field installation personnel to properly translate a number in base 10 to a number in base 2 in order to set the address properly.

Another way to set the address is by using standard rotary switches or slide switches. However, the use of either rotary or slide switches limits the set of addresses to just a few number of variations. And, the rotary or slide switches take up considerable space, especially if two or more are needed. Accordingly, a need exists to more easily set the address (or other parameters) in the notification appliance.

SUMMARY

The present embodiments relate to an input device that may work in combination with an electronic device (such as a notification appliance). The input device may be configured to input one or more adjustable parameters to the electronic device. The input device may input the one or more adjustable parameters by using a plurality of concentric rotary dials. In particular, the concentric rotary dials are co-planar with one another, and share a common center, axis or origin with one inside the other. The concentric rotary dials may have different radii from one another. Further, the concentric rotary dials have a plurality of indicia on one surface of the concentric rotary dials (such as the upper surface). Or, the indicia may be on a surface adjacent to the concentric rotary dials (such as on a non-movable faceplate). A user may move the concentric rotary dials to one or more settings in order to select one of the plurality of indicia.

One, some, or all of the concentric rotary dials may include one or more interaction points with which to interact with a printed circuit board (or other electronic element). In one example, the one or more interaction points comprise one or more contact pins on one side of the dial, such as the underside of the concentric rotary dial. The one or more contact pins on the underside of the concentric rotary dial is conductive (such as metallic) and contacts or touches one or more contacts on a printed circuit board (or other electronic component designed to interface with the concentric rotary dials) that is positioned next to the concentric rotary dial. In one embodiment, the concentric rotary dial may include a single contact pin or protrusion on the underside of the concentric rotary dial. For example, the single pin may interact with circuitry (such as a plurality of conductive lines on a printed circuit board), and may act as a bridge between two separate contacts on the printed circuit board, thereby completing the circuit to indicate that a particular parameter is selected. The plurality of conductive lines on the printed circuit board may be electrically connected to a controller (or other circuitry) configured to select one of the plurality of the first indicia and to select one of the plurality of the second indicia.

The concentric rotary dials may be integral with the printed circuit board (or other electronic component designed to interface with the concentric rotary dials). Or, the concentric rotary dials may comprise a input module that is separate from the printed circuit board, and that is designed to interact with the printed circuit board. In this way, the module for the concentric rotary dials may provide data (such as one or more inputs indicative of the selected indicia on the one or more concentric rotary dials) to a printed circuit board.

In another embodiment, the concentric rotary dial may include multiple contact pins or protrusions on the underside of the concentric rotary dial. For example, the underside of the dial may include two pins, each contacting different portions of the printed circuit board. The dial may further connect the pins electrically, such as by connecting the pins within the dial via a metal conductor. In this way, the two pins may complete the circuit.

In another example, the one or more interaction points of the concentric rotary dial comprise one or more magnets or other element that are proximate to (but not physically touching) a portion of the printed circuit board. When the magnet or other element is proximate to the portion of the printed circuit board, a measurable response, such as a measurable electrical response, is induced in the portion of the printed circuit board.

The printed circuit board may include one or more processors, such as a microprocessor, microcontroller, or other general controller or logic. The processor on the printed circuit board may determine a position of the one or more concentric rotary dials based on a communication point of the concentric rotary dial (such as the physical connection of the one or more contact pins with the printed circuit board).

The concentric rotary dials may include numbers, letters and/or symbols on one or more sides of the rotary dial (such as on an upper face of the rotary dial). Or, the concentric rotary dials may include an arrow, pointer, or the like. To set a parameter or configuration, each of the concentric dial(s) is rotated to the desired setting for that dial. In this way, when the contact pin on each of the dials makes contact with the appropriate contact on the printed circuit board, the processor can read the parameter or configuration based on the position of contact.

For example, the concentric rotary dial may include numbers 0 to 9 on the upper side of the rotary dial. One of the concentric rotary dials may be rotated to a predetermined position (such as at the 9:00 position if the rotary dial were envisioned as a clock) to select one of the numbers on the upper side of the rotary dial. If the number 6 is desired, the concentric rotary dial is rotated such that the number 6 is in the 9:00 position. Likewise, other concentric rotary dials may be rotated to the predetermined position (such as to the 9:00 position). In this way, the set numbers, letters, and/or symbols may be in a single line and proximate to one another so that the configuration of the concentric dials may be easily read.

The concentric rotary dials may be supported in a variety of ways. In one embodiment, a post may be placed at the common center of the concentric rotary dials to provide structural support for one or more of the concentric rotary dials. The post may comprise a slip ring and also serve as an electrical connection to the printed circuit board.

In addition, the one or more contact pins may provide structural support for the rotary dial in addition to providing electrical contact with the printed circuit board. The placement of the one or more pins may provide for stability of the dial. For example, in a dial with multiple pins, the placement of the pins may be distributed such that the dial is evenly supported.

Moreover, the two or more of the concentric rotary dials may provide structural support by being mechanically inter-dependent. The concentric rotary dials may be mechanically inter-dependent in one of several ways. In one embodiment, the concentric rotary dials may provide inter-dependent support. An example of this is where a first concentric dial provides structural support for a second concentric dial. The first concentric dial may include a lip or a shelf upon which the second concentric dial at least partially sits. The first dial with the lip may be an inner dial and the second dial upon which it partially sits may be an outer dial. Or, the first dial with the lip may be an outer dial and the second dial upon which it partially sits is an inner dial.

In another embodiment, the concentric rotary dials are inter-dependent by inter-locking with one another. A first surface of an inner dial may contact with a second surface of an outer dial. The first surface of the inner dial and the second surface of the outer dial may include one or more structures that enable the first and second dial to inter-lock. For example, a surface of the inner dial (such as an outer edge) contacts a surface of the outer dial (such as an inner edge). One (or both) of these contact surfaces of the inner and outer dial may include one or more structures that enable the dials to inter-lock. The structures may, for example, be one or more notches or other type of indentations and one or more protrusions that mate with the notches/indentations. The notches/indentations may be placed on one of the contact surfaces (whether on the inner or outer dial) and the protrusions may be placed on the other of the contact surface. As discussed above, a contact pin on the concentric dial interfaces with contacts on the printed circuit board. The inter-locking of the dials may better allow the dial to interface with the contacts of the printed circuit board.

The notches or indentations may be evenly distributed along the contact surface of one concentric dial (such as span across an entire outer edge of the inner concentric dial). And, the one or more protrusions may span across the entire surface of the opposing contact surface of a second concentric dial (such as span across the entire inner edge of the outer concentric dial). For example, the notches or indentations may span across an entire outer edge of the inner concentric dial, and the one or more protrusions may span across the entire inner edge of the outer concentric dial, with the one or more protrusions mating with the notches or indentations. As another example, the one or more protrusions may span across an entire outer edge of the inner concentric dial, and the notches or indentations may span across the entire inner edge of the outer concentric dial, with the one or more protrusions mating with the notches or indentations. Or, the notches or indentations may span only part of the outer surface of the inner dial (such as an upper half), and the protrusions may span across only part of the inner surface of the outer dial (such as an upper half).

To configure the multiple concentric dials, the concentric dials may be moved to a predetermined position, as discussed above. If the concentric dials are mechanically inter-dependent, the movement of one dial may affect the movement of a second dial. For example, if the notches or indentations span the entire outer surface, the dial may need to be completely lifted upward to disengage from the other dial, put in the proper position, and then slid back downward to engage with the other dial. If the notches or indentations span only a part of the outer surface, the dial need only be lifted partly upward (so that it does not inter-lock with the other dial), put in the proper position, and then slid back downward to engage with the other dial.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

A concentric rotary dial system for use with an electronic device is provided. The concentric rotary dials in the system enable a user to manually input a configuration onto the electronic device. The electronic device may comprise a device configured to receive a manual input from the user. The manual input may be related to any aspect of operation of the electronic device. For example, the user may manually input an address for a notification appliance in a fire alarm system. As another example, the user may input the date and/or time. However, these examples are merely for illustration purposes only.

Figure 1A:
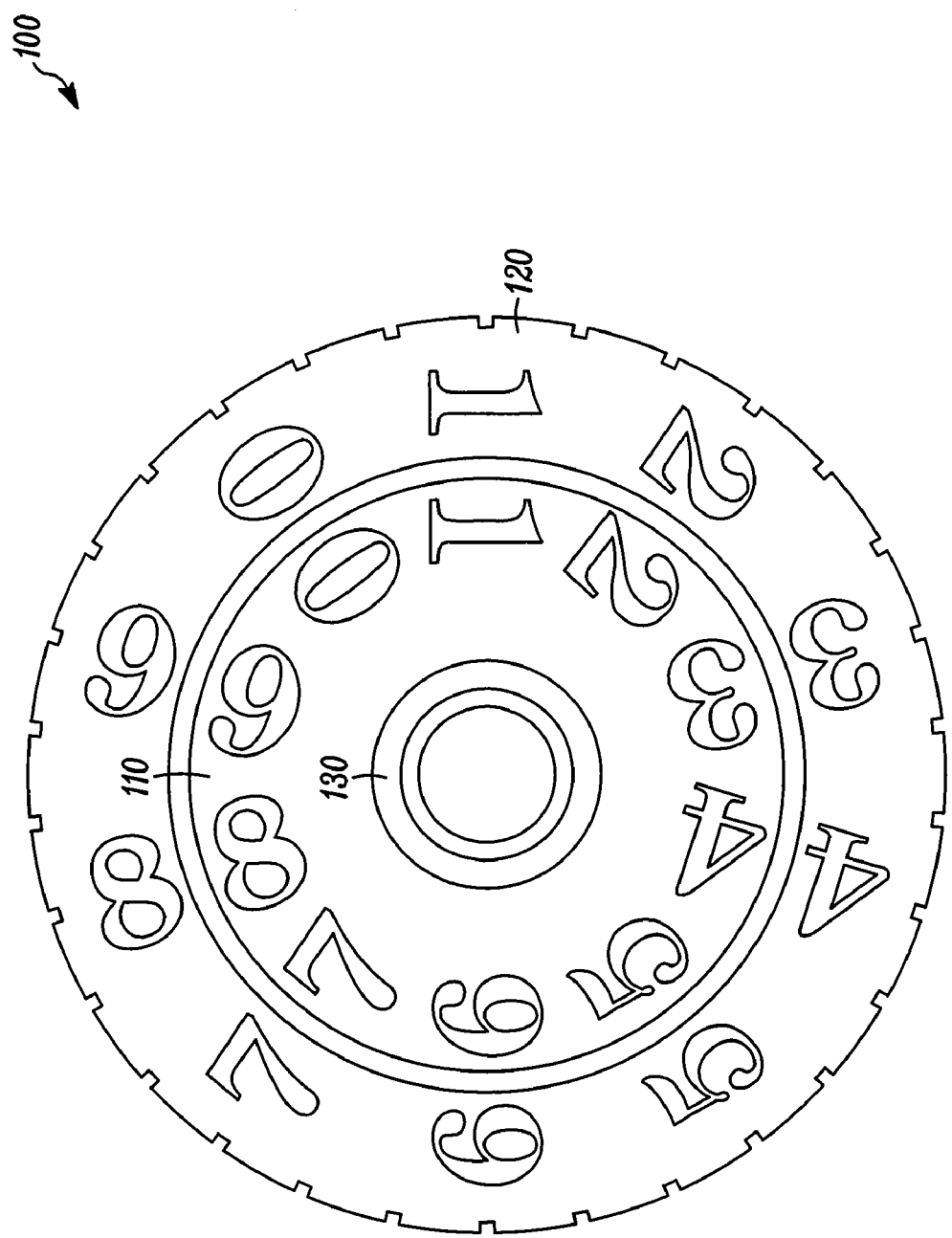
FIG. 1A is a top view of two concentric rotary dials.
Figure 1B:
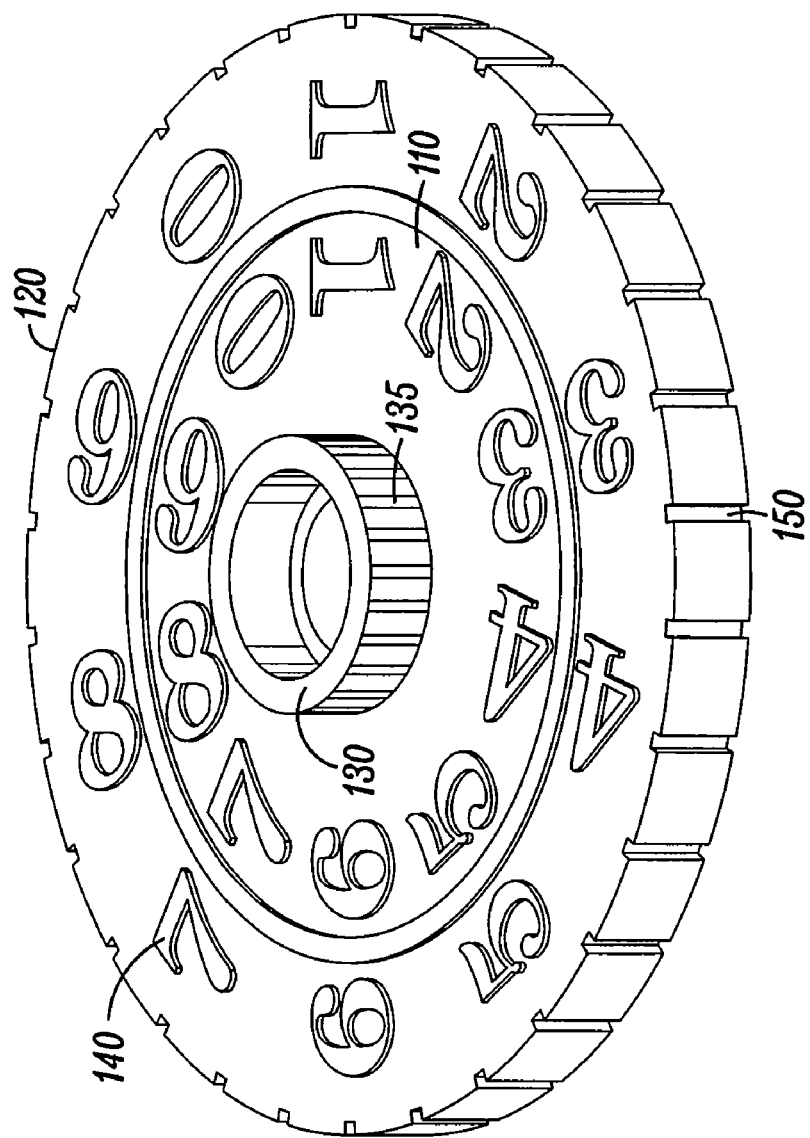
FIG. 1B is a top perspective view of the two concentric rotary dials depicted in FIG. 1A.

Referring to the figures, FIG. 1A is a top view of one part of a concentric rotary dial system 100, including multiple concentric rotary dials 110, 120. FIG. 1B is a top perspective view of the part of a concentric rotary dial system 100, including the multiple concentric rotary dials 110, 120 depicted in FIG. 1A. Though two dials are depicted in FIGS. 1A-1B, more than two dials may be used. For example, a third concentric dial (with a larger radius than dials 110, 120) may be used.

As illustrated in FIGS. 1A-1B, concentric dial 110 and concentric dial 120 are co-planar with one another, and share a common center, axis or origin with one inside the other. Further, concentric rotary dials 110, 120 have different radii from one another, with concentric dial 110 having a smaller radius than concentric dial 120.

One or more structures on the concentric dials 110, 120 enable movement of the dials. For example, a raised knob 130 may be configured along with one or more of the concentric dials 110, 120. As illustrated in FIGS. 1A-1B, raised knob 130 is attached to the innermost concentric dial 110, and is coaxial with concentric dial 110. Raised knob 130 includes scoring 135 in order for a user to rotate the concentric dial 110. The scoring on raised knob 135 may comprise parallel line cuts equally spaced from one another. Further, the raised knob 130 may be used to lift concentric dial 110, as discussed in more detail below. FIG. 1B further shows one or more notches 150 (or other type of incision) on the outer surface of concentric dial 120, which may be used to rotate the concentric dial 120. Further, indentations 150 may be used to make the concentric dials mechanically inter-dependent, as discussed in more detail below.

The concentric dials 110, 120 may include indicia 140. The indicia may comprise one or more distinguishing marks, such as letters (including alphabet letters, language characters, etc.), numbers, symbols, or combinations thereof. The indicia 140 may be distributed evenly around the concentric dials 110, 120, as illustrated in FIGS. 1A-1B. Or, the indicia 140 may be distributed unevenly around the concentric dials 110, 120.

Further, two or more of the dials may have the same indicia. For example, concentric dials 110, 120 illustrated in FIGS. 1A-1B each have numbers 0 to 9. The placement of numbers on concentric dials 110, 120 are such that the spacing in between each of the numbers is the same. The spacing between the numbers on concentric dial 110 is smaller than the spacing between the numbers on concentric dial 120 since the radius of concentric dial 110 is smaller than the radius of concentric dial 120.

Alternatively, two or more of the concentric rotary dials may have the different indicia. For example, one concentric rotary dial may have a first range of indicia (such as from 0 to 4) and a second concentric rotary dial may have a second range of indicia (such as from 5 to 9). As another example, one concentric rotary dial may have a first set of indicia (such as from 0, 2, 4, 6, 8) and a second concentric rotary dial may have a second set of indicia (such as from 1, 3, 5, 7, 9).

Because of the dials 110, 120 being concentric and because of the even spacing of the indicia around the dials 110, 120, the indicia are in a line radiating outward from the center axis of the dials. As discussed in more detail with respect to FIGS. 2A-2B, the positioning of the indicia in this manner allows for easier manual input using the concentric dials.

The concentric dials 110, 120 may interact with another part of the electronic device, such as a printed circuit board of the electronic device. In particular, the concentric dials 110, 120 may interact with the printed circuit board via one or more interaction points. The interaction between the concentric dials 110, 120 and the printed circuit board may take one of several forms, including electrical, magnetic, and/or optical interaction. And, the interaction points may take one of several forms, including one or more electrical contacts and/or one or more magnets.

Figure 1C:
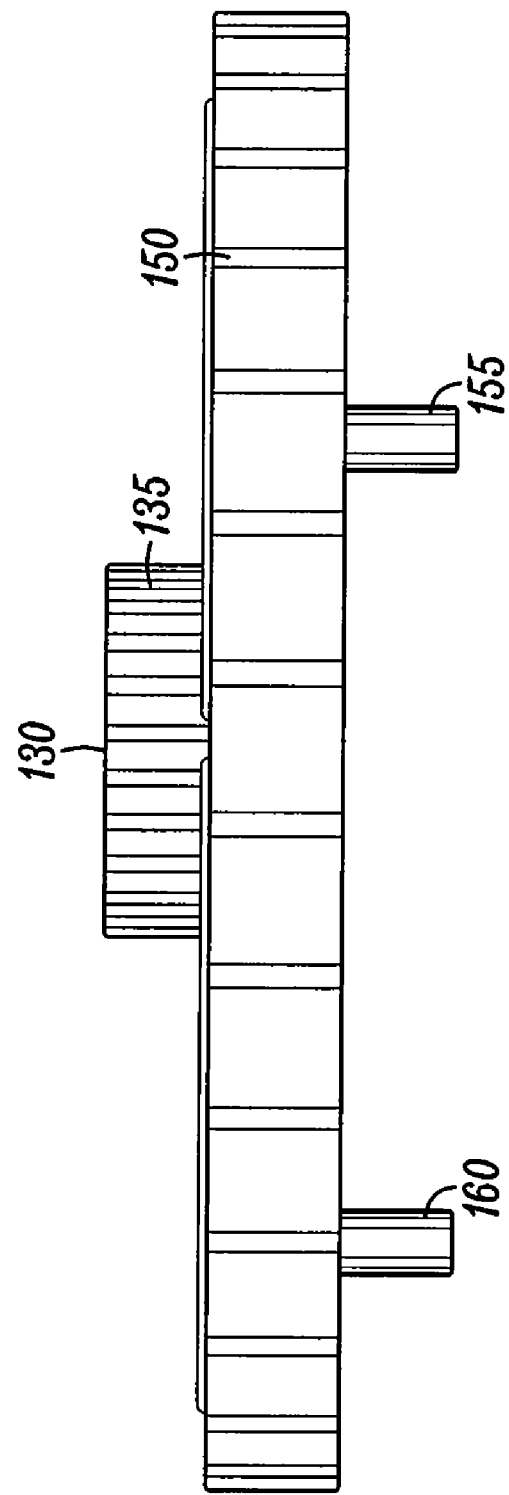
FIG. 1C is a side view of the two concentric rotary dials depicted in FIG. 1A.
Figure 1D:
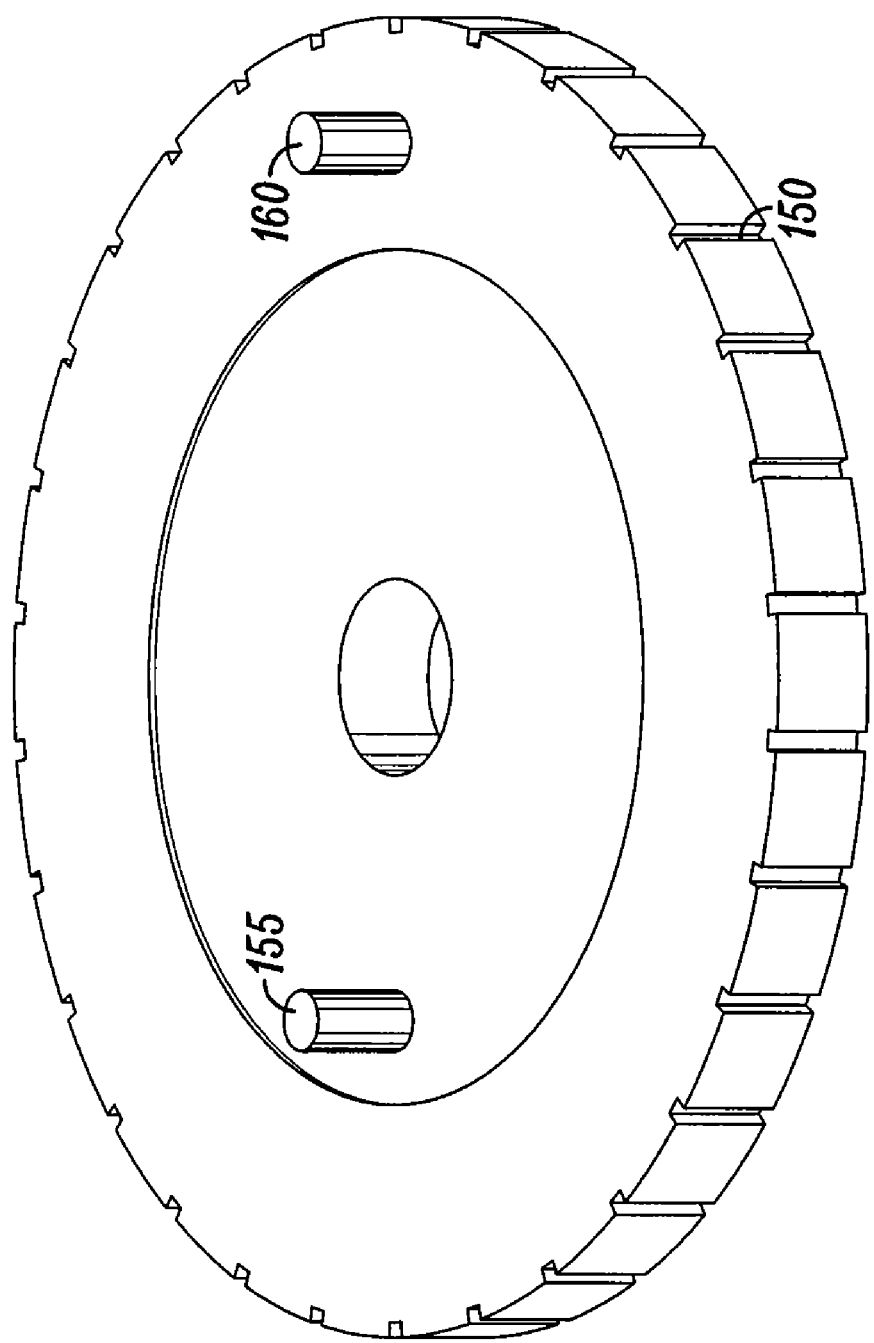
FIG. 1D is a bottom perspective view of the two concentric rotary dials depicted in FIG. 1A.

In one example, the one or more interaction points comprise one or more contact pins on one side of the dial, such as the underside of the concentric rotary dial. FIGS. 1C-1D illustrate contact pins 155, 160, with FIG. 1C being a side view of the multiple concentric rotary dials depicted in FIG. 1A, and FIG. 1D being a bottom perspective view of the multiple concentric rotary dials depicted in FIG. 1A. The one or more contact pins 155, 160 on the underside of the concentric rotary dial may be electrically conductive (such as metallic) and may contact or touch one or more contacts on a printed circuit board (or other electronic component designed to interface with the concentric rotary dials) that is positioned next to or underneath the concentric rotary dial. As discussed in more detail below with respect to FIGS. 4A-4B, the concentric rotary dial may include a single contact pin or protrusion on the underside of each concentric rotary dial. For example, the single pin may act as a bridge between two separate contacts on the printed circuit board, thereby completing the circuit to indicate that a particular parameter is selected. As discussed in more detail below with respect to FIG. 4C, the concentric rotary dial may include multiple contact pins or protrusions on the underside of the concentric rotary dial. For example, the underside of the dial may include two pins, each contacting different portions of the printed circuit board. The dial may further connect the pins electrically, such as by connecting the pins within the dial via a metal conductor. In this way, the two pins may complete the circuit. As discussed in more detail below, completion of the circuit may be used to indicate that one of the indicia has been selected.

In another example, the one or more interaction points of the concentric rotary dial comprise one or more magnets, or other element that, are proximate to (but not physically touching) a portion of the circuit board the printed circuit board. When the magnet or other element is proximate to the portion of the printed circuit board, a measurable response, such as a measurable electrical response, is induced in the portion of the printed circuit board.

Figure 1E:
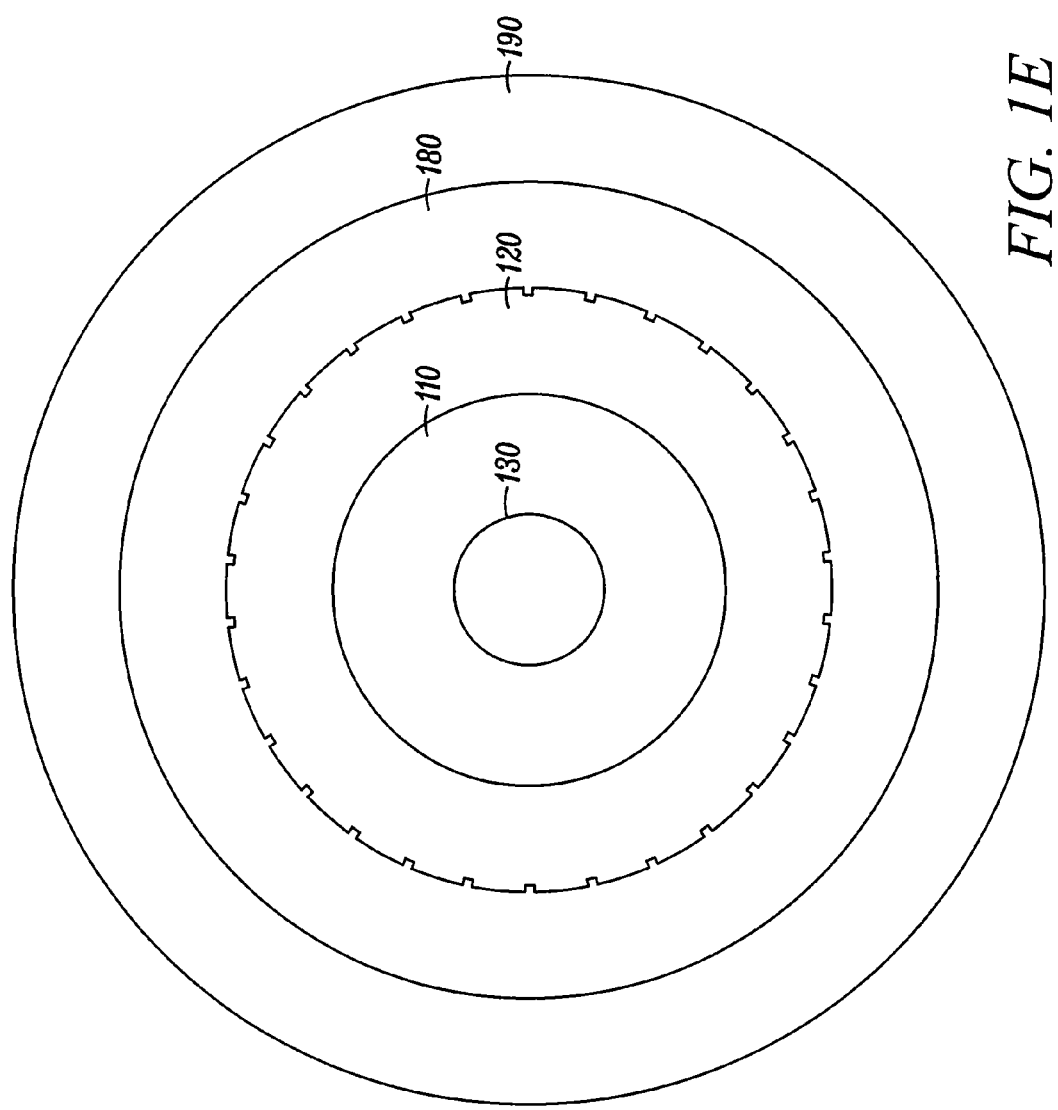
FIG. 1E is a top view of four concentric rotary dials.

FIG. 1E is a top view of four concentric rotary dials. As discussed above, there may be two or more concentric rotary dials. FIG. 1E illustrates four concentric rotary dials, with innermost concentric rotary dial 110, second innermost concentric rotary dial 120, third innermost concentric rotary dial 180, and outer concentric rotary dial 190. Each of dials 110, 120, 180, 190 may move independently or may move interdependently.

Figure 2A:
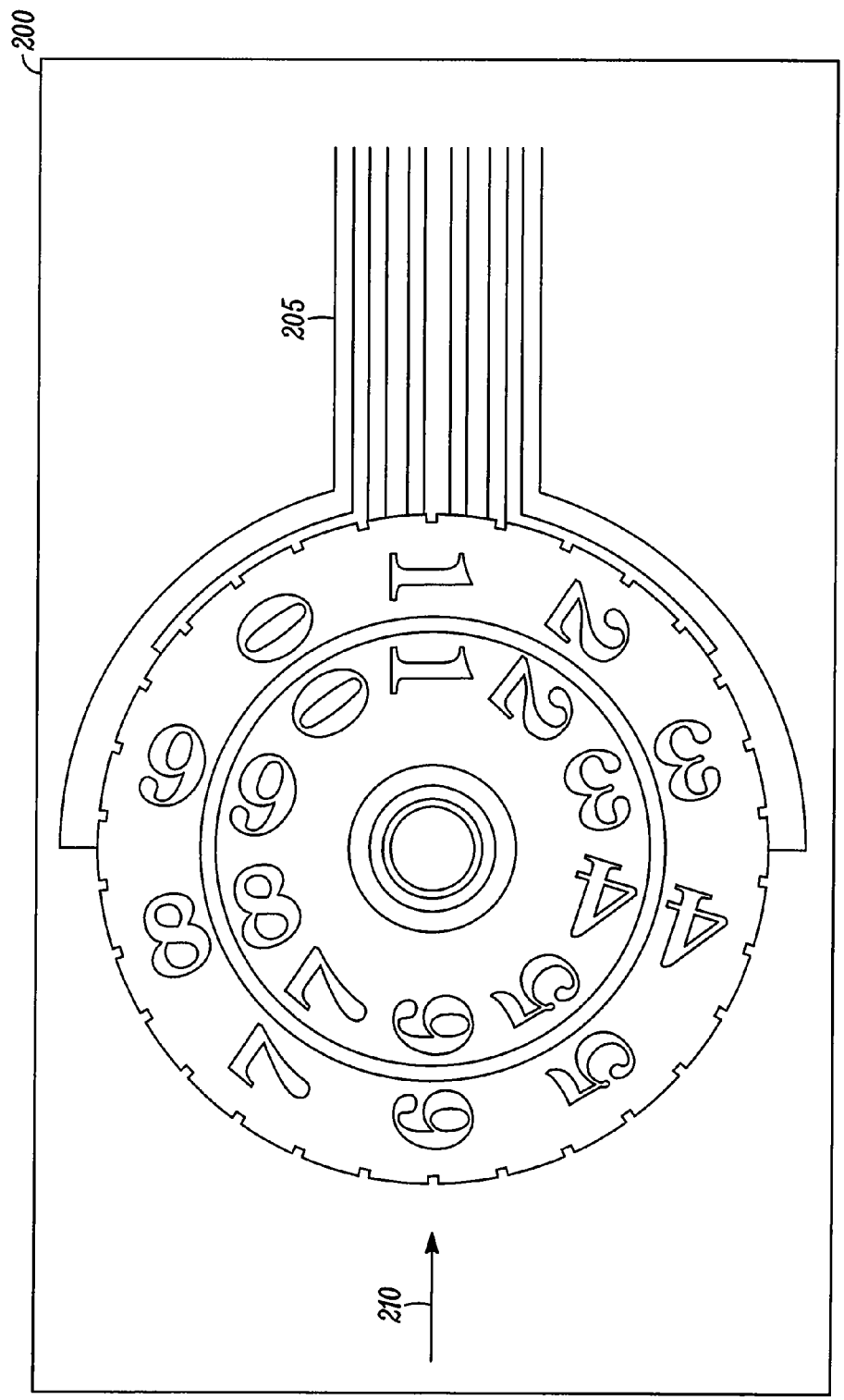
FIG. 2A is a top view of two concentric rotary dials mounted on a printed circuit board.
Figure 2B:
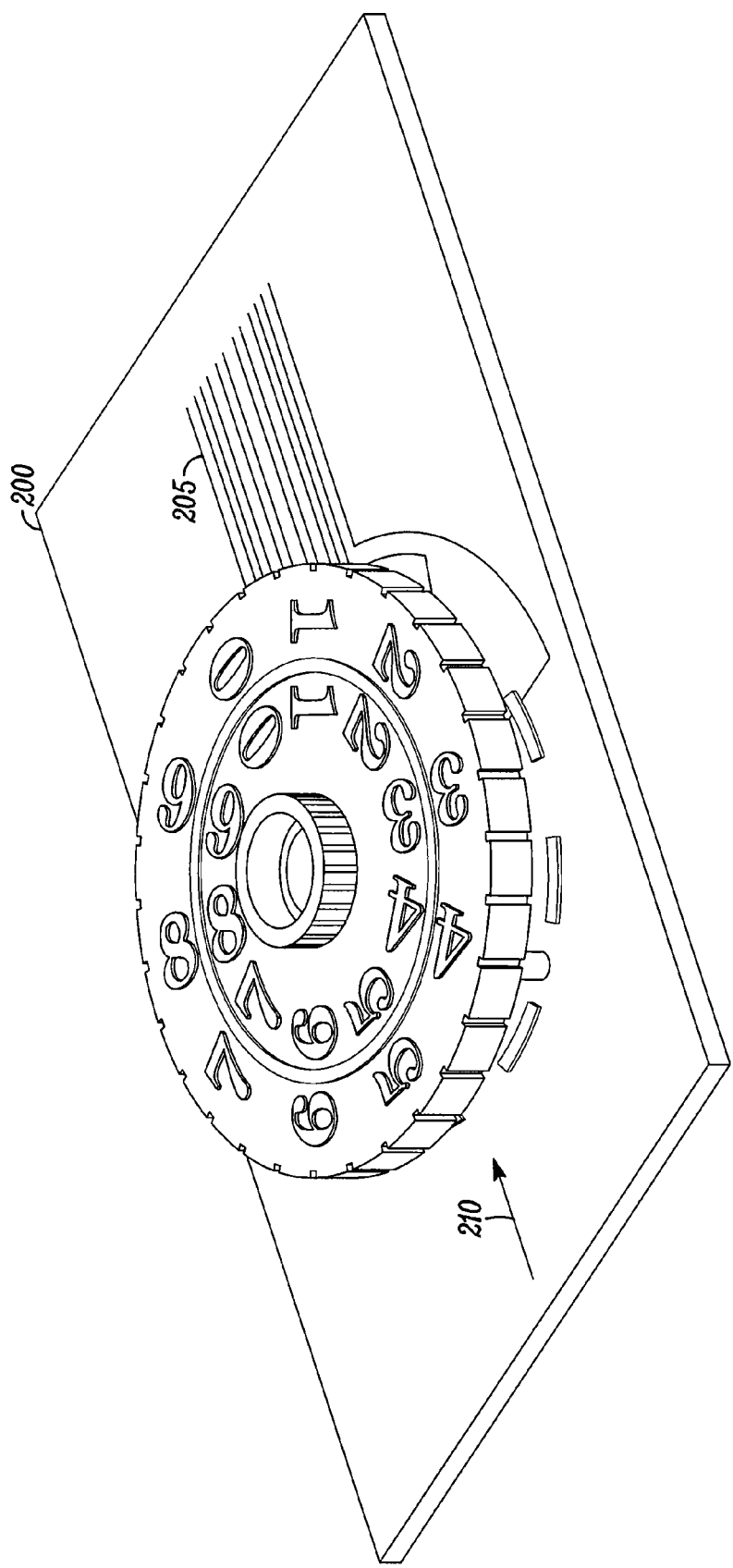
FIG. 2B is a top perspective view of the two concentric rotary dials and printed circuit board depicted in FIG. 2A.

FIG. 2A is a top view of the multiple concentric rotary dials and printed circuit board, and FIG. 2B is a top perspective view of the multiple concentric rotary dials and printed circuit board depicted in FIG. 2A. As shown in FIGS. 2A-2B, printed circuit board 200 includes wires 205. A user may move the concentric dials 110, 120 into a desired position. FIGS. 2A-2B include arrow 210 to indicate to the user which indicia selected for that dial. Arrow 210 may be placed on the printed circuit board, on a portion of the housing that houses the electronic component, or on a separate part (such as a plate that is placed on the housing). In this way, the indicia for the concentric dials for the desired setting (as indicated by arrow 210) are selected. For example, the predetermined position in FIGS. 2A-2B is akin to the 9:00 position if the rotary dial were envisioned as a clock. If the number 66 is desired, each concentric rotary dial is rotated such that its number 6 is in the 9:00 position (as depicted in FIGS. 2A-2B). In this way, the set numbers, letters, and/or symbols may be set in a single line and proximate to one another so that the configuration of the concentric dials may be easily read.

Further, the user moves the dials to a desired position, as discussed above. In order to provide feedback to the user that the configuration has been input as desired, the user may receive one or more types of feedback. One type of feedback may comprise an output device (such as a display device, an audio output device, a vibration output device, etc.) that outputs the configuration input by the user. For example, if the manual input is in the form of an address, the address that the electronic device determines that was input by the user may be output on a display (such as I/O 312 illustrated in FIG. 3). The user may view the display and determine whether the manual input has been interpreted correctly. If the input has been interpreted correctly by the electronic device, the user need not do anything further. If the input has been misinterpreted by the electronic device, the user may move the dials again. Another type of feedback may comprise feedback on the dial itself, such as on the face of the dial. As discussed below, the concentric dials may include two contact pins with a conductive wire there between. When the concentric dial completes the circuit (and current flows in the conductive wire in between the two contact pins), the concentric dial may illuminate a part of the conductive dial. For example, if the "3" has been selected, an LED under the "3" may be illuminated in order to indicate to the user that the "3" has been selected for input. Still another type of feedback may comprise feedback using the printed circuit board. When logic on the printed circuit board determines that an input has been selected, it may illuminate an LED, which may light up a part of the concentric dial (such as underneath the concentric dial proximate to arrow 210).

Figure 3:
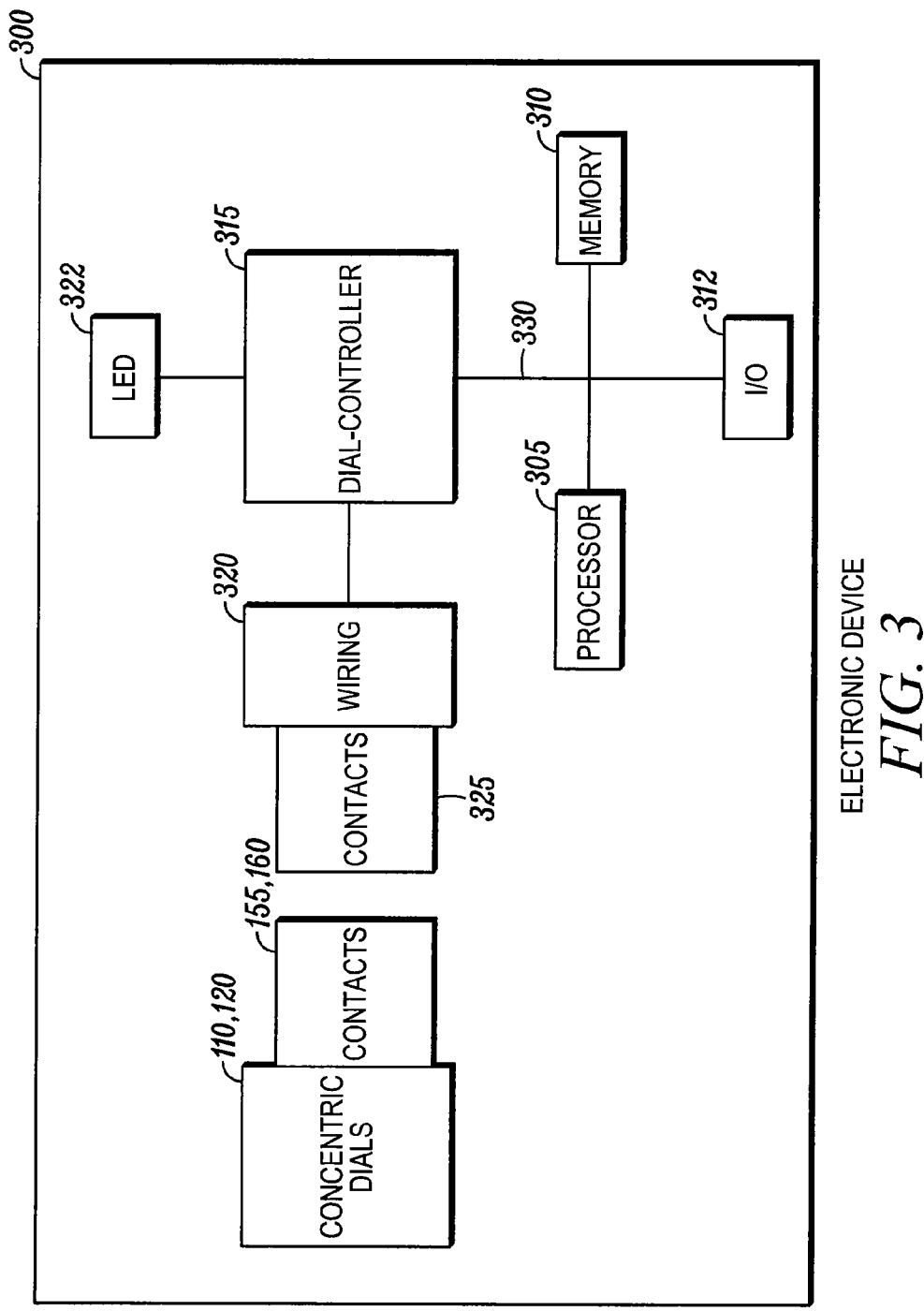
FIG. 3 is a block diagram of an electronic device with multiple concentric rotary dials.

FIG. 3 is a block diagram of an electronic device 300 with multiple concentric rotary dials 110, 120. The concentric rotary dials may be integrated with any type of electronic device 300 in order to set one or more parameters of the electronic device 300. The electronic device 300 may comprise any physical entity in an electronic system used to affect the electrons or their associated fields in a desired manner consistent with the intended function of the electronic device 300. Components of the electronic device 300 may be connected together, such as by being soldered to a printed circuit board to create an electronic circuit with a particular function (such as, for example, an amplifier, a radio receiver, etc.). The electronic device may be analog or digital. As discussed above, one example of the electronic device 300 is a fire alarm notification device, such as those discussed in U.S. Pat. No. 6,426,697, incorporated by reference herein in its entirety.

Figure 4A:
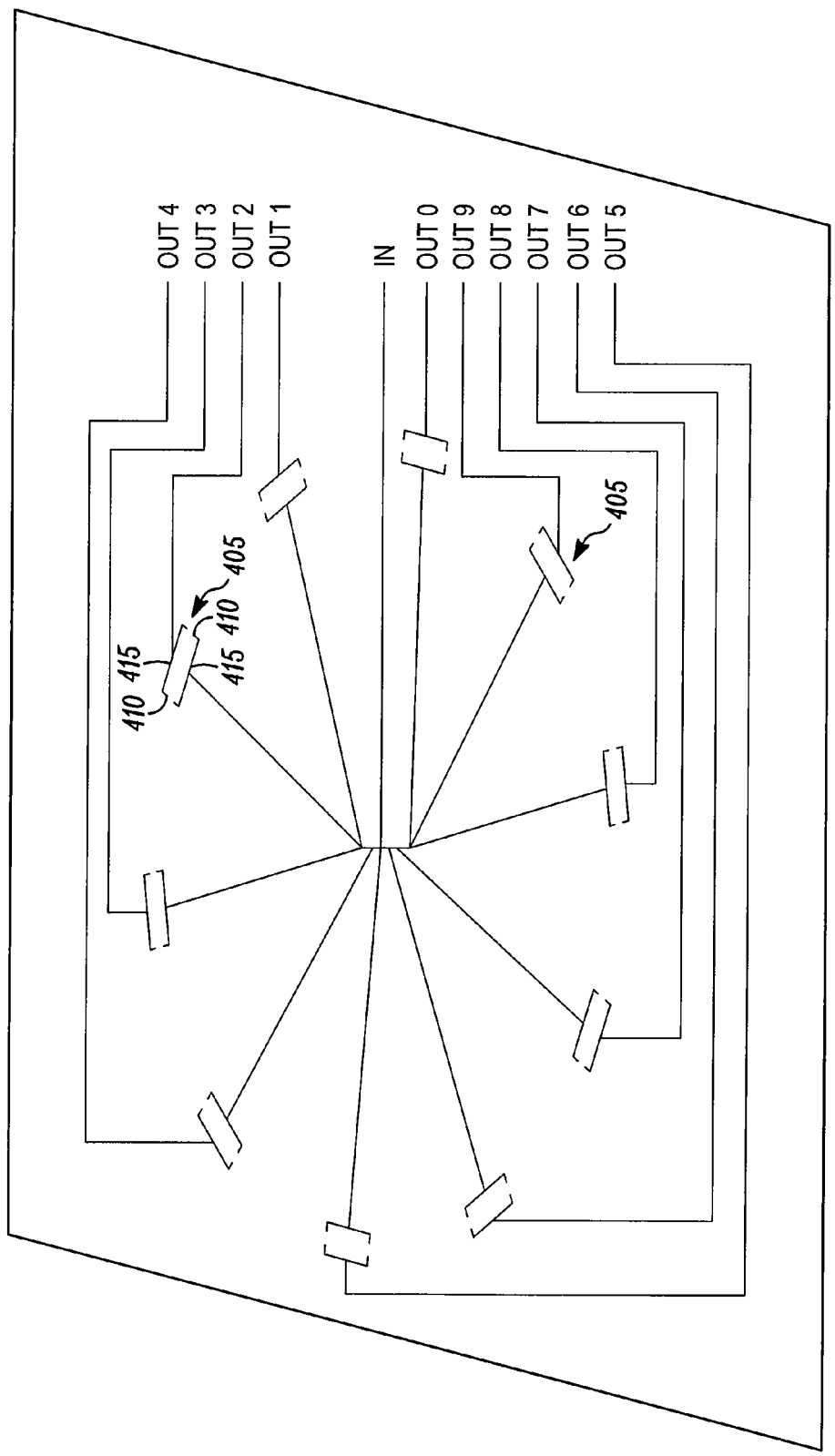
FIG. 4A is one example of a schematic depicting the contact locations and wiring for the printed circuit board.
Figure 4B:
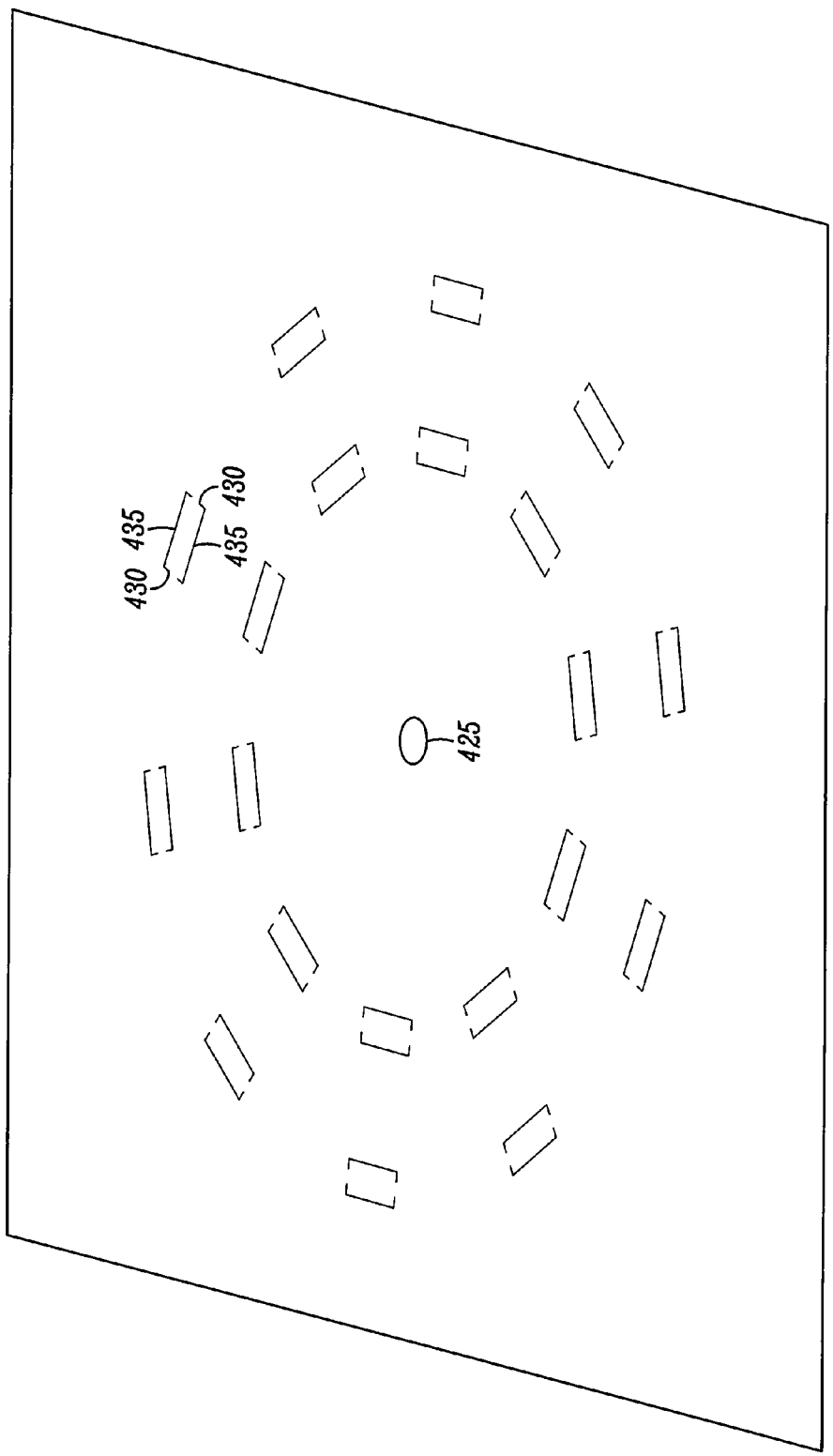
FIG. 4B is another example of contact locations for the printed circuit board (without traces).

The concentric dials 110, 120 include one or more contacts 155, 160 that interact with contacts 325 of the electronic device 300. The contacts 325 may be part of a printed circuit board. The contacts 325 are electrically connected to a dial controller 315 via wiring 320. An example of the wiring is illustrated in FIGS. 4A-4B. Though FIG. 3 depicts the interaction between the wiring 320 and the dial controller 315 as a single line, the wiring 320 and the dial controller 315 may communicate via multiple wires, as depicted in FIG. 4A.

The dial controller 315 may sense the configuration of one or more of the concentric dials 110, 120. For example, the dial controller 315 may send one or more electrical signals to one subset of the contacts 325, and sense electrical signals from another subset of the contacts 325. An example of this is illustrated in FIG. 4A. The dial controller 315 may thus sense a position of one, some, or all of the concentric dials 110, 120, and may send the determined position(s) to another element within the electronic device. For example, the dial controller 315 may in turn communicate with other electrical elements (such as processor 305 and memory 310) of electronic device 300 via a bus 330. The processor 305 may receive the determined position(s) of the concentric dials 110, 120, and control other aspects of the electronic device accordingly. Further, when the dial controller 315 determines senses the position of one, some or all of the concentric dials 110, 120, the dial controller 315 may activate LED 322 in order to illuminate a portion of the concentric dials 110, 120 in order to provide feedback to the user, as discussed above.

For example, in a system with 4 concentric dials, the processor 305 may receive from the dial controller 315 the determined positions of the concentric dials as "3" (for the outermost dial), "5" (for the second outermost dial), "1" (for the third outermost dial), and "0" (for the fourth outermost dial, or the innermost dial). The processor 305 may interpret the determined positions as an address for the electronic device of "3510". The processor 305, in turn, may store the address of "3510" in memory 310, and may further communicate the address to another electronic device external to the electronic device 300 (such as a control panel in a fire alarm system).

As shown in FIG. 3, electronic device includes separate elements of the dial controller 315 for determining the positions of the concentric dials 110, 120, and the processor 305 for interpreting the determined positions. The concentric dials 110, 120 may be a separate module that works in conjunction with dial controller 315 and/or processor 305. Or, the concentric dials 110, 120 may be integral with dial controller 315 and/or processor 305. Further, a single processor (or microcontroller) that incorporates the functionality of both the dial controller 315 and the processor 305 may be used.

FIG. 4A illustrates one example of a schematic depicting the contact locations and wiring for the printed circuit board. The contacts and wiring may be for one of the concentric dials, such as an innermost concentric dial. One input signal (IN) may be input. The input signal may be driven from dial controller 315, and may include a predetermined voltage (such as 5V) or predetermined waveform (such as a sinusoidal waveform or a square wave). FIG. 4A further illustrates multiple output signal lines ($OUT_0$ through $OUT_9$). Further, the printed circuit board may include one or more contact locations 405. As depicted in FIG. 4A, there are 10 contact locations 405. Each contact location 405 may comprise a hole bounded by four sides. Two of the sides (opposing one another) may comprise conductive sides 415 and two of the sides (opposing one another) comprise insulative sides 410 (shown as broken lines). In this way, when contact 155 contacts the contact location 405, the contact 155 electrically connects the two conductive sides 415, thereby completed the circuit. The signal on the input signal line IN is then transmitted to the corresponding output signal line (one of $OUT_0$ to $OUT_9$). For example, if the contact 155 contacts the "1" position (corresponding to the output signal line $OUT_1$), the circuit from the input signal line IN to $OUT_1$ signal line is completed, and the input signal on the input signal line IN is then transmitted to $OUT_1$ signal line. The dial controller may sense the output signal lines to determine which of the output signal lines includes the input signal.

FIG. 4B illustrates another example of contact locations 405 for the printed circuit board. As shown, there are two sets of contact locations 405 for each of the two concentric dials, such as concentric dials 110, 120 depicted in FIGS. 1A-1B. Similar to FIG. 4A, the contact locations 405 comprise a hole bounded by four sides. Two of the sides (opposing one another) may comprise conductive sides 430 and two of the sides (opposing one another) comprise insulative sides 435. In this way, when contact 155 contacts the contact location 405, the contact 155 electrically connects the two conductive sides 430, thereby completing the circuit. Further, FIG. 4B illustrates a post 425 at the concentric axis.

Figure 4C:
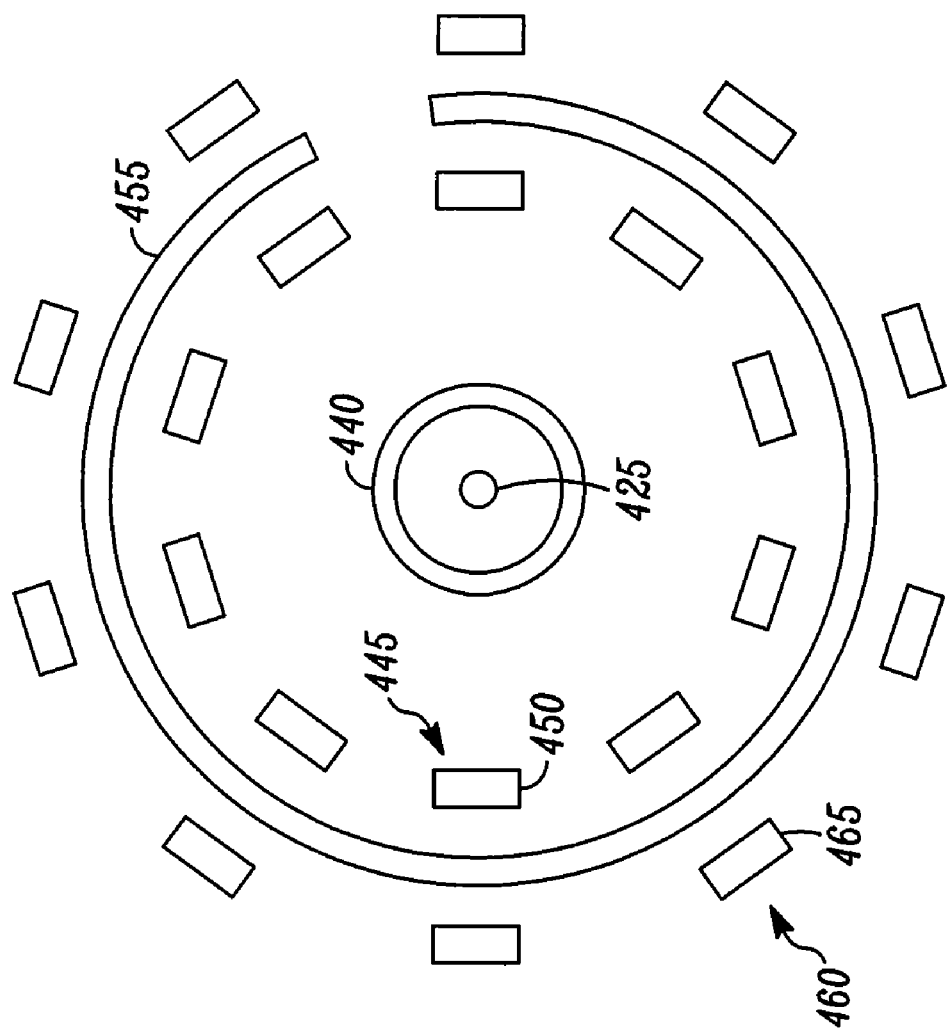
FIG. 4C is still another example of contacts for the printed circuit board (without traces).

FIG. 4C is still another example of contacts for the printed circuit board. Unlike the configurations of FIGS. 4A-4B, the contacts in FIG. 4C work with each concentric dial having at least two contact pins. A first contact pin for the concentric dial may contact a first portion of the printed circuit board and a second contact pin for the concentric dial may contact a second portion of the printed circuit board. The first contact pin and the second contact pin may be electrically connected via a conductor internal to the concentric dial. In this way, the concentric dial may complete the electrical circuit when the first contact pin for the concentric dial contacts the first portion of the printed circuit board and the second contact pin for the concentric dial contacts the second portion of the printed circuit board.

As illustrated in FIG. 4C, an innermost concentric dial may contact ring 440, which may include the input signal, and may contact contact locations 445. Each contact location 445 may comprise a hole bounded by four sides, with each of the four sides comprising conductive sides 450. An outer concentric dial may contact strip 455, which may include the input signal, and may contact contact locations 460. Each contact location 460 may comprise a hole bounded by four sides, with each of the four sides comprising conductive sides 465.

The concentric rotary dials may be physically supported in a variety of ways. In one embodiment, a post (illustrated as 425 in FIGS. 4B-4C) may be placed at the common center of the concentric rotary dials to provide structural support for one or more of the concentric rotary dials. The post 425 may be part of a slip ring and also serve as an electrical connection to the printed circuit board. A slip ring is a method of making an electrical connection through a rotating assembly. A slip ring may comprise a conductive circle or band mounted on a shaft and insulated from it. Electrical connections from the rotating part of the system (in this instance the concentric dial), are made to the ring. Fixed contacts or brushes may run in contact with the ring, transferring electrical power or signals to the exterior, static part of the system.

In addition, the one or more contact pins may provide structural support for the concentric dial in addition to providing electrical contact with the printed circuit board. The placement of the one or more pins may provide for stability of the dial. For example, in a dial with multiple pins, the placement of the pins may be distributed such that the dial is evenly supported.

Figure 5A:
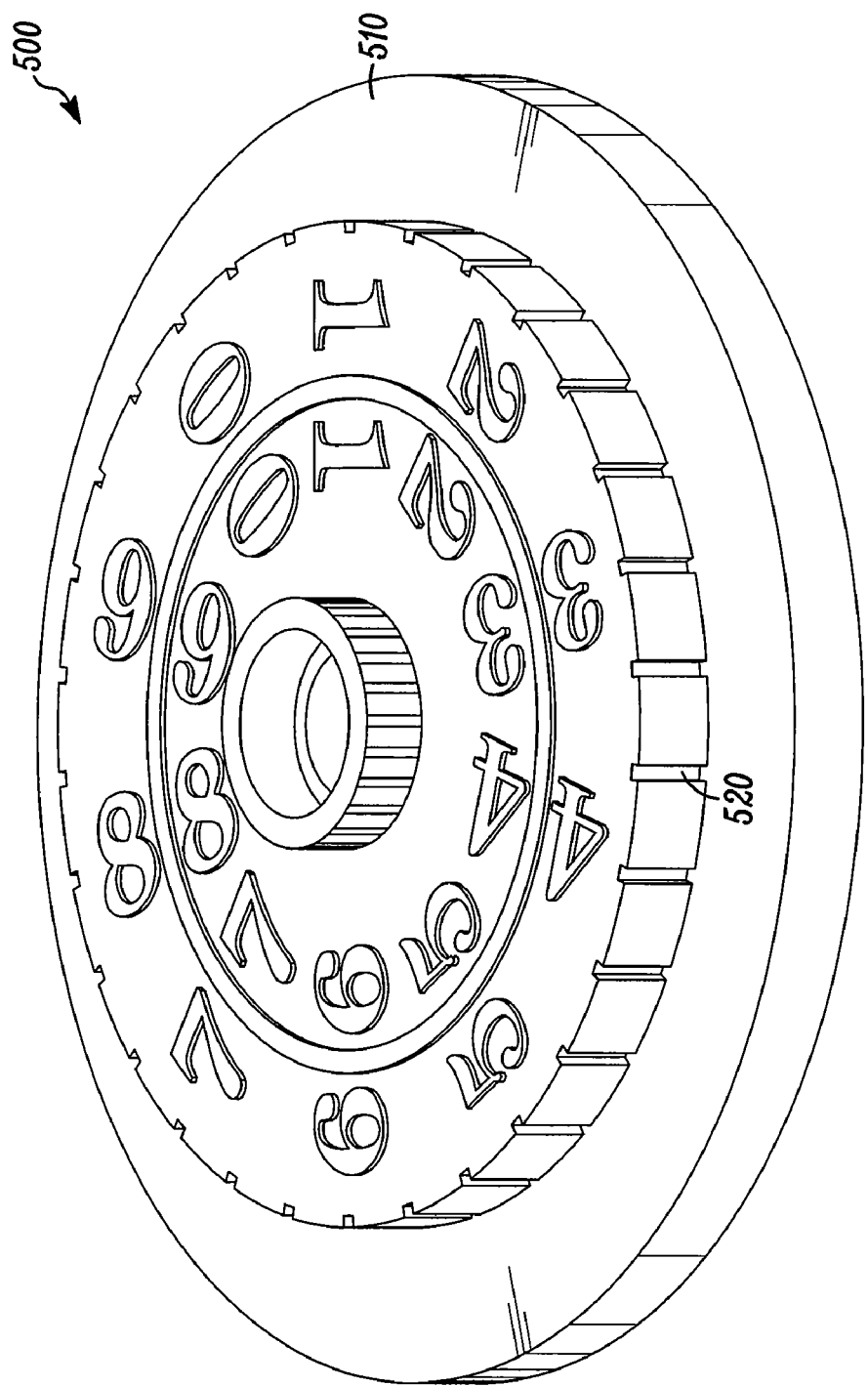
FIG. 5A is a top perspective view of a concentric ring depicting a lip.
Figure 5B:
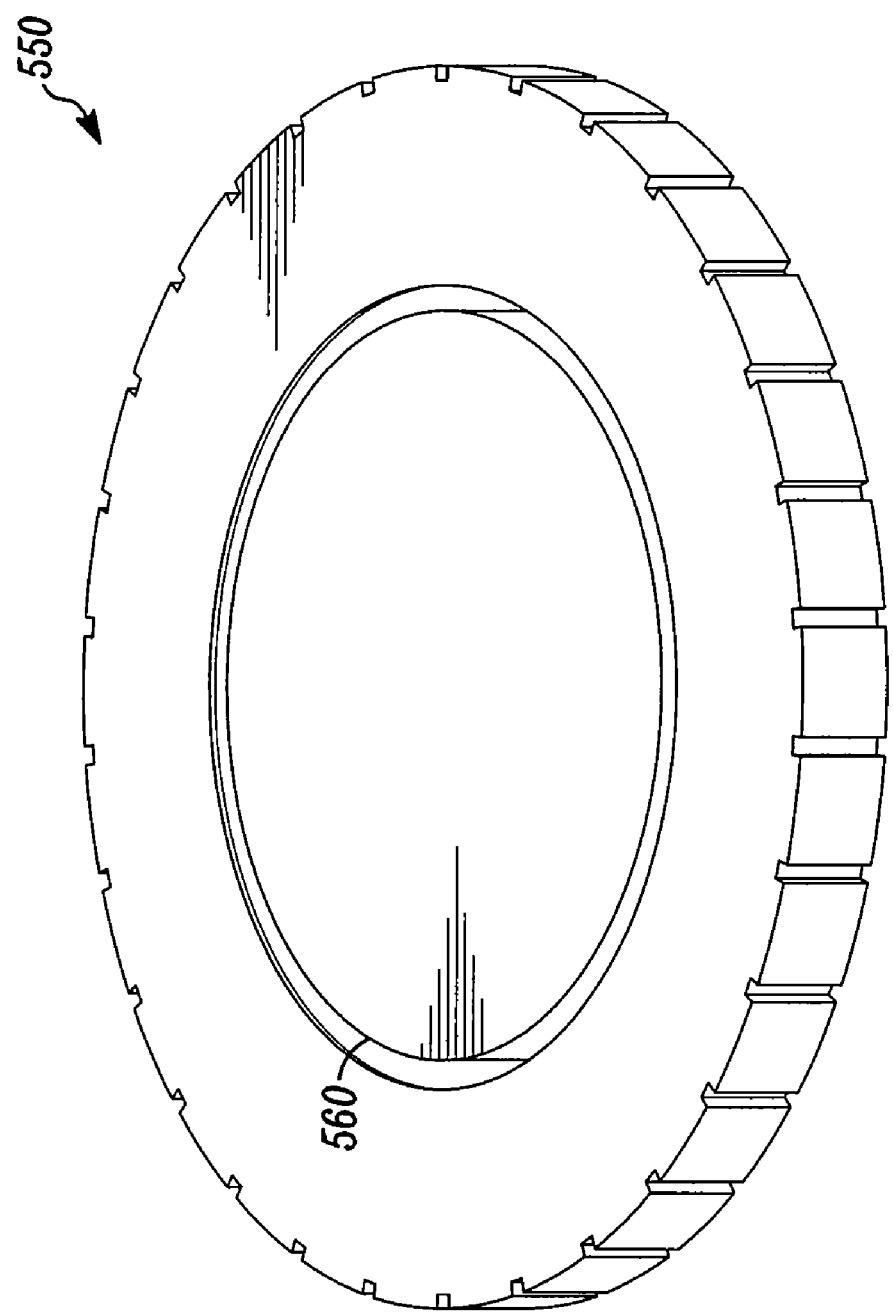
FIG. 5B is a bottom perspective view of a concentric ring depicting a shelf that mates with the lip of FIG. 5A.

Moreover, the two or more of the concentric rotary dials may provide structural support by being mechanically inter-dependent. The concentric rotary dials may be mechanically inter-dependent in one of several ways. In one embodiment, the concentric rotary dials may provide inter-dependent support. An example of this is where a first concentric dial provides structural support for a second concentric dial. The first concentric dial may include a lip or a shelf upon which the second concentric dial at least partially sits. The first dial with the lip may be an inner dial and the second dial upon which it partially sits may be an outer dial. This is illustrated in FIG. 5A, which is a top perspective view of a concentric ring 500 depicting the lip 510. A second concentric ring may sit or rest on the flat portion of the lip 510. This is illustrated in FIG. 5B, which is a bottom perspective view of a concentric ring 550 depicting a shelf 560 that mates with the lip 510 of FIG. 5A. Or, the first dial with the lip may be an outer dial and the second dial upon which it partially sits is an inner dial.

In another embodiment, the concentric rotary dials are inter-dependent by inter-locking with one another. A first surface of an inner dial may contact with a second surface of an outer dial. The first surface of the inner dial and the second surface of the outer dial may include one or more structures that enable the first and second dial to inter-lock. For example, a surface of the inner dial (such as an outer edge) contacts a surface of the outer dial (such as an inner edge). One (or both) of these contact surfaces of the inner and outer dial may have include one or more structures that enable the dials to inter-lock. The structures may, for example, be one or more notches or indentations and one or more protrusions that mate with the notches/indentations. The notches/indentations may be placed on one of the contact surfaces (whether on the inner or outer dial) and the protrusions may be placed on the other of the contact surface. Examples of the structures include indentations 150 depicted in FIGS. 1B-1D, and the indentations 520 depicted in FIG. 5A. As shown in FIGS. 1B-1D and FIG. 5A, different types of indentations may be used. The indentations of one concentric dial may mate with protrusions on another concentric dial, thereby limiting the positions to a discrete number of positions in which the one concentric dial may be configured. For example, the one concentric dial may have 10 indentations (one indentation for each indicia, such as 0 through 9, on the concentric dial). The concentric dial may only be placed in one of the 10 indentations in order to limit the number of inputs of the concentric dial. In turn, the mating of the indentations on one concentric dial with protrusions on another concentric dial reduce the potential for error in the contact pin on the underside of the concentric dial contacting the designed portion on the printed circuit board. More particularly, the inter-locking of the dials may better allow the contacts on the underside of the dial to interface with the contacts of the printed circuit board.

The notches or indentations may be evenly distributed along the contact surface of one concentric dial (such as span across an entire outer edge of the inner concentric dial). And, the one or more protrusions may span across the entire surface of the opposing contact surface of a second concentric dial (such as span across the entire inner edge of the outer concentric dial). For example, the notches or indentations may span across an entire outer edge of the inner concentric dial, and the one or more protrusions may span across the entire inner edge of the outer concentric dial, with the one or more protrusions mating with the notches or indentations. As another example, the one or more protrusions may span across an entire outer edge of the inner concentric dial, and the notches or indentations may span across the entire inner edge of the outer concentric dial, with the one or more protrusions mating with the notches or indentations. Or, the notches or indentations may span only part of the outer surface of the inner dial (such as an upper half), and the protrusions may span across only part of the inner surface of the outer dial (such as an upper half).

To configure the multiple concentric dials, the concentric dials may be moved to a predetermined position, as discussed above. If the concentric dials are mechanically inter-dependent, the movement of one dial may affect the movement of a second dial. For example, if the notches or indentations span the entire outer surface, the dial may be completed lifted upward to disengage from the other dial, put in the proper position, and then slid back downward to engage with the other dial. If the notches or indentations span only a part of the outer surface, the dial need only be lifted partly upward (so that it does not inter-lock with the other dial), put in the proper position, and then slid back downward to engage with the other dial.

Figure 6:
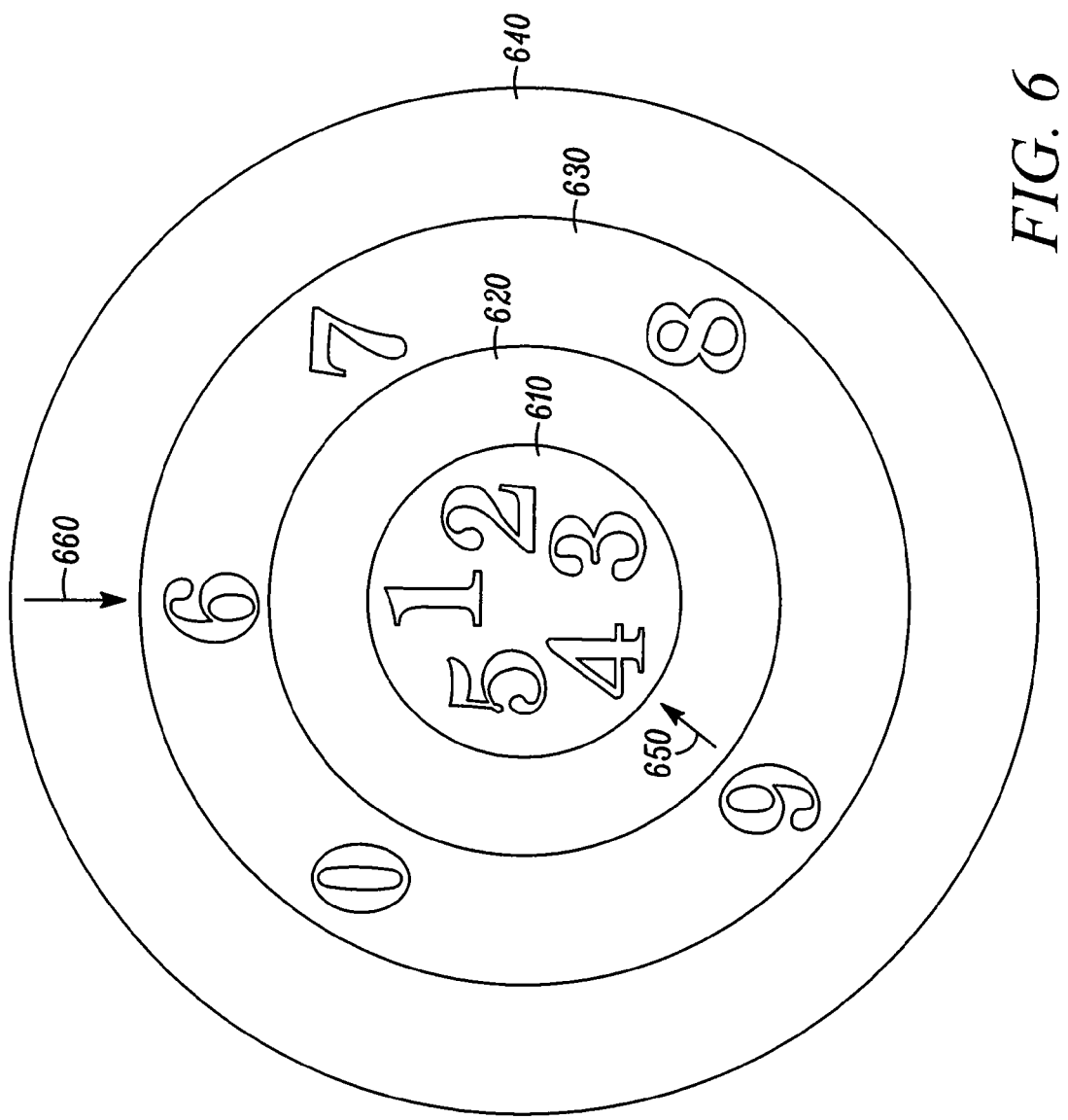
FIG. 6 illustrates a top view of two rotating concentric dials and two non-movable portions.

FIG. 6 illustrates a top view of two rotating concentric dials and two stationary portions. As discussed above, the rotating concentric dials may include indicia on the upper portion of the concentric dials. Alternatively, the indicia may be placed on one or more portions that are not movable. And, one or more movable concentric circles may move in relation to the non-movable portions. The non-movable portions may be part of the housing or may be a faceplate (such as an escutcheon) that is attached to the housing. More specifically, FIG. 6 illustrates a first non-movable concentric faceplate 610 that includes indicia (such as indicia "1" to "5") and a second non-movable concentric faceplate 630 that includes indicia (such as indicia "6" to "0"). FIG. 6 further illustrates a first movable concentric circle 630 and a second movable concentric circle 650. Though FIG. 6 illustrates four circles (two movable and two non-movable), more circles may be used. First movable concentric circle 630 includes a first arrow 650 and second movable concentric circle 650 includes a second arrow 660. A user may move first movable concentric circle 630 in a clockwise or a counter-clockwise movement so that first arrow 650 is pointing to the desired indicia on first non-movable concentric faceplate 610. In FIG. 6, first arrow 650 is moved until it is pointing to indicia "4" on first non-movable concentric faceplate 610. Likewise, the user may move second movable concentric circle 650 in a clockwise or a counter-clockwise movement so that second arrow 660 is pointing to the desired indicia on second non-movable concentric faceplate 630. In FIG. 6, second arrow 650 is moved until it is pointing to indicia "6" on second non-movable concentric faceplate 630. So that, the setting of input device depicted in FIG. 6 is depicted as "6" "4".

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. An input device for a user to select a plurality of indicia, the input device comprising:
    a first rotatable dial, the first rotatable dial comprises a first interaction point used to indicate a first numerical indicia;
    a second rotatable concentric dial, the second rotatable concentric dial concentric with the first rotatable dial and comprises a second interaction point used to indicate a second numerical indicia, the second rotatable concentric dial sharing a common axis of rotation with the first rotatable dial; and
    circuitry in communication with the first rotatable dial and the second rotatable concentric dial and configured to:
        receive an indication of the first numerical indicia and an indication of the second numerical indicia; and
        determine a numerical setting of the input device, wherein the numerical setting comprises a single number with a plurality of digits, one of the plurality of digits being based on the indication of the first numerical indicia and another of the plurality of digits being based on the indication of the second numerical indicia.

2. The input device of claim 1, wherein the first interaction point on the first rotatable dial comprises a bottom surface of the first rotatable dial; and
    wherein the second interaction point on the second rotatable concentric dial comprises a bottom surface of the second rotatable dial.

3. The input device of claim 2, wherein the circuitry in communication with the first rotatable dial and the second rotatable concentric dial comprises:
    circuitry for interacting with the first interaction point and the second interaction point; and
    circuitry configured to determine the numerical setting of the input device based on the circuitry for interacting with the first interaction point and the second interaction point.

4. The input device of claim 3, wherein the first interaction point comprises a first contact;
    wherein the second interaction point comprises a second contact;
    wherein the circuitry for interacting with the first interaction point and the second interaction point comprises a plurality of conductive lines configured to mechanically contact with the first contact and the second contact; and
    wherein the circuitry configured to determine the numerical setting of the input device comprises a controller electrically connected to the plurality of conductive lines.

5. The input device of claim 4, wherein the first rotatable dial electrically contacts with the plurality of conductive lines solely via the first contact.

6. The input device of claim 4, wherein the first rotatable dial comprises multiple contacts configured to electrically contact with the plurality of conductive lines.

7. The input device of claim 1, wherein one of the first rotatable dial or the second rotatable concentric dial is mechanically interdependent on another of the first rotatable dial or the second rotatable concentric dial.

8. The input device of claim 7, wherein the one of the first rotatable dial or the second rotatable concentric dial is supported by the another of the first rotatable dial or the second rotatable concentric dial.

9. The input device of claim 1, further comprising circuitry configured to provide feedback to the user selecting the plurality of the indicia.

10. The input device of claim 1, wherein the first rotatable dial includes digits 0 through 9 on a face of the first rotatable dial; and
    wherein the second rotatable concentric dial includes digits 0 through 9 on a face of the second rotatable concentric dial.

11. The input device of claim 1, wherein the first rotatable dial is coplanar with the second rotatable concentric dial.

12. The input device of claim 1, further comprising a third rotatable concentric dial, the third rotatable concentric dial comprises a third interaction point used to indicate a third numerical indicia, the third rotatable concentric dial sharing a common axis of rotation with the first rotatable dial and the second rotatable concentric dial, a radius of the third rotatable concentric dial being different from the radius of the first rotatable dial and the radius of the second rotatable concentric dial; and
    wherein the single number includes at least a 3-digit number, with a first digit of the single number being based on the indication of the first numerical indicia, a second digit being of the single number based on the indication of the second numerical indicia, and a third digit being of the single number based on the indication of the third numerical indicia.

13. The input device of claim 1, wherein the input device is in communication with an addressable electronic device; and
    wherein the single number is indicative of an address of the addressable electronic device.

14. The input device of claim 7, wherein the first rotatable dial and the second rotatable concentric dial are configured such that moving one of the first rotatable dial or the second rotatable concentric dial comprises:
pulling the one of the first rotatable dial or the second rotatable concentric dial upward from another of the first rotatable dial or the second rotatable concentric dial;
moving the one of the first rotatable dial or the second rotatable concentric dial to a desired position; and
pushing the one of the first rotatable dial or the second rotatable concentric dial to lock into the another of the first rotatable dial or the second rotatable concentric dial.

15. A method for selecting a plurality of indicia, the method comprising:
receiving a first electronic indication in response to electrical contact with a first rotatable dial, the first rotatable dial comprises a first interaction point used to indicate a first numerical indicia;
receiving a second electronic indication in response to electrical contact with a second rotatable concentric dial, the second rotatable concentric dial concentric with the first rotatable dial and comprises a second interaction point used to indicate a second numerical indicia, the second rotatable concentric dial sharing a common axis of rotation with the first rotatable dial dial; and
determining a numerical setting of the input device, wherein the numerical setting comprises a single number with a plurality of digits, one of the plurality of digits being based on the first electronic indication of the first numerical indicia and another of the plurality of digits being based on the second electronic indication of the second numerical indicia.

16. The method of claim 15, wherein the first rotatable dial is coplanar with the second rotatable concentric dial.

17. A method for selecting a plurality of indicia, the method comprising:
moving a first rotatable dial the first rotatable dial comprises a first interaction point used to indicate a first setting; and
moving a second rotatable concentric dial, the second rotatable concentric dial comprises a second interaction point used to indicate a second setting, the second rotatable concentric dial sharing a common axis of rotation with the first rotatable dial and being coplanar with the first rotatable dial, a radius of the second rotatable concentric dial being different from a radius of the first rotatable dial,
wherein moving the first rotatable dial and moving the second rotatable concentric dial are interdependent,
wherein the first rotatable dial comprises a plurality of protrusions,
wherein the second rotatable concentric dial comprises a plurality of notches, the notches shaped to mate with the protrusions,
wherein the first rotatable dial abuts the second rotatable concentric dial so that the first rotatable dial and the second rotatable concentric dial are mechanically interdependent via the plurality of notches and the plurality of protrusions, and
wherein moving one of the first rotatable dial or the second rotatable concentric dial comprises:
pulling the one of the first rotatable dial or the second rotatable concentric dial upward from another of the first rotatable dial or the second rotatable concentric dial;
moving the one of the first rotatable dial or the second rotatable concentric dial to a desired position; and
pushing the one of the first rotatable dial or the second rotatable concentric dial to lock into the another of the first rotatable dial or the second rotatable concentric dial.

* * * * *

UNITED STATES PATENT AND TRADEMARK OFFICE
CERTIFICATE OF CORRECTION

PATENT NO. : 8,383,967 B2
APPLICATION NO. : 12/819936
DATED : February 26, 2013
INVENTOR(S) : Janardhan Kindikeri Page 1 of 1

It is certified that error appears in the above-identified patent and that said Letters Patent is hereby corrected as shown below:

In the Claims:

Claim 15 - Column 13
Line 13
Whereas: "of rotation with the first rotatable dial dial; and"
Should be corrected to read: "of rotation with the first rotatable dial; and"

Claim 17 - Column 14
Line 3
Whereas: "moving a first rotatable dial the first rotatable dial com-"
Should be corrected to read: "moving a first rotatable dial, the first rotatable dial com-"

Signed and Sealed this
Twenty-ninth Day of October, 2013

Teresa Stanek Rea
*Deputy Director of the United States Patent and Trademark Office*